April 21, 1953

A. S. LERMER 2,635,806

MEANS AND METHOD FOR MECHANICALLY
ASSEMBLING NOMOGRAPHIC CHARTS

Filed Dec. 24, 1949

AUGUST S. LERMER
INVENTOR.

BY Harry Ernest Rubens

AUGUST S. LERMER
INVENTOR.

April 21, 1953

A. S. LERMER 2,635,806

MEANS AND METHOD FOR MECHANICALLY
ASSEMBLING NOMOGRAPHIC CHARTS

Filed Dec. 24, 1949

AUGUST S. LERMER
INVENTOR.

BY Harry Ernest Rubens

April 21, 1953

A. S. LERMER 2,635,806

MEANS AND METHOD FOR MECHANICALLY ASSEMBLING NOMOGRAPHIC CHARTS

Filed Dec. 24, 1949

AUGUST S. LERMER
INVENTOR.

BY
Harry Ernest Rubens

Patented Apr. 21, 1953

2,635,806

UNITED STATES PATENT OFFICE 2,635,806

MEANS AND METHOD FOR MECHANICALLY ASSEMBLING NOMOGRAPHIC CHARTS

August S. Lermer, New York, N. Y.

Application December 24, 1949, Serial No. 134,968

6 Claims. (Cl. 235—61)

My invention relates to nomographic charts, and more particularly to alignment charts having readily attachable and detachable pre-fabricated scales for use with pre-arranged chart blanks.

The principles upon which nomographic charts are based are well known and have been employed for formulas of various kinds.

Nomographic charts consist in the representation of an equation having two or more variables by means of two or more properly positioned scales. An index line intersects the scales at points whose values satisfy the equation.

It has hitherto been the practice to prepare the charts with scales drawn at their proper location, a time consuming problem which is only justified if the particular chart is to be extensively used.

The principal object of my invention is to provide means and methods for enabling nomographic charts to be quickly and inexpensively prepared. Such saving in time hitherto required to prepare proper charts will permit their general acceptance instead of the limited use which they now enjoy.

Another object is to provide means and methods for making nomographic charts easily reproducable without reference to master charts.

Other objects are to provide nomographic charts which may be inexpensively made to permit individual use for graphical compositions and filed with other references pertaining to the technical problem involved; to provide charts which are adjustable; which do not require drawing or lettering of figures; which are of great precision; which are errorproof, require no drafting for scale reproduction and can be reproduced by any well known reproduction method and which may be easily disassembled.

I accomplish these and other objects and obtain my new results as will be apparent from the device described in the following specification, particularly pointed out in the claims, and illustrated in the accompanying drawing, in which—

Figure 1:
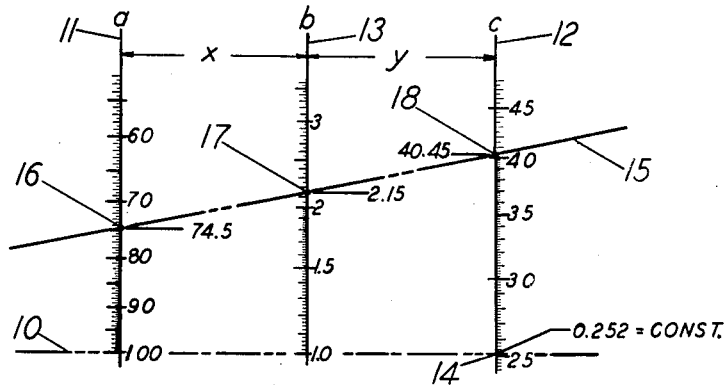
Fig. 1 is a typical nomographic chart having parallel scales.

As illustrated in Fig. 1, I have chosen a simple nomographic chart having three variables represented by the equation:

$$c = k(a \times b)$$

where the given value of the constant $k=0.252$, $a=74.5$ and $b=2.5$, and the problem is to find the resultant unknown $c$ by a graphical method.

In equations involving multiplication and division, the scales representing the values of the variables must be parallel, and since there are three variables in the above example, there must necessarily be three scales. The scales are in logarithmic form as the solution is to be solved by graphically adding or subtracting the logarithmic values of the variables by drawing a straight line between the two known values to intersect the scale representing the unknown value.

The zero line or abscissa is first constructed. The outerscales $a$ and $c$, 11 and 12 respectively, are drawn parallel to each other and perpendicular to the zero line 10 and spaced apart any convenient distance. The modulus ($m$) or the length of the scale in inches for each logarithmic cycle for the outer scales ($ma$ for the $a$ scale etc.) is then arbitrarily chosen. In this example the moduli of the outer scales $ma$ and $mc$ is 10 and are equal. The location and modulus of the inner scale $b$, 13, is then determined. The spacing of the scale $b$ is obtained by the ratio $$\frac{x}{y} = \frac{ma}{mc}$$

or the ratio of the modulus of the outer scales which since they are equal results in a ratio of 1 to 1 and the scale $b$ is equidistant from the outer scales. The modulus $mb$ of the center scale is determined by multiplying the modulus of the outer scales and dividing by their sum $$\left(\frac{ma \times mc}{ma + mc}\right)$$

which in the above example would be $$\frac{100}{20}$$

or 5 or one half the outer scales. The center scale $b$ would thus have two logarithmic cycles for each cycle in the outer scales.

Where it is desirable to increase the range of the $c$ scale its modulus must be decreased or in other words the number of cycles increased in accordance with the above formula.

Where it is intended that the $c$ scale be utilized for further computations with additional scales as will be later described (Fig. 5), it is desirable to have it positioned on the outer right hand side. In this manner the $c$ scale may be conveniently used in a second computation without complicating the chart by additional crossing lines. When the $c$ scale is thus positioned on the outside, the direction of the scale is reversed with respect to scales $b$ and $a$ as illustrated in Fig. 1.

Normally, the scales $a$, $b$ and $c$ will start or end the cycle at the zero line 10, unless there is a constant factor, such as is found in the above example of 0.252 in which case this value of 0.252 or point 14 on the $c$ scale is positioned at the zero line. The logarithmic value of the constant is thus added to the resultant. In the case of division it would be subtracted.

Returning to the example, the unknown variable on the $c$ scale is determined by drawing a straight line 15 connecting the $a$ value 74.5, designated as 16, with the $b$ value 2.15, 17, and the third value of 40.25 or 18 is found at the insection on the $c$ scale.

Figure 4:
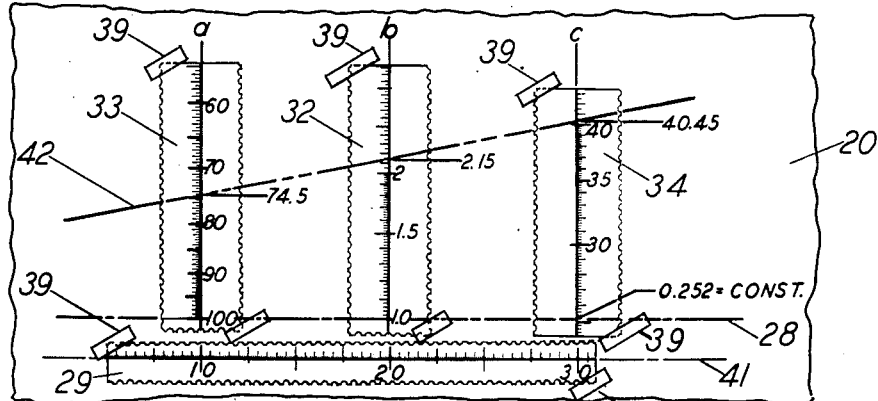
Fig. 4 represents a nomographic chart prepared in accordance with my invention with three scales removed from the set illustrated in Fig. 2.
Figure 3:
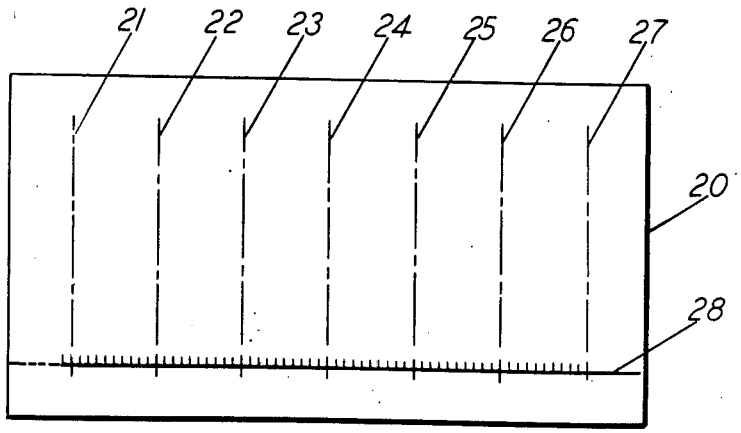
Fig. 3 represents an alignment chart blank as provided by me, greatly reduced.
Figure 2:
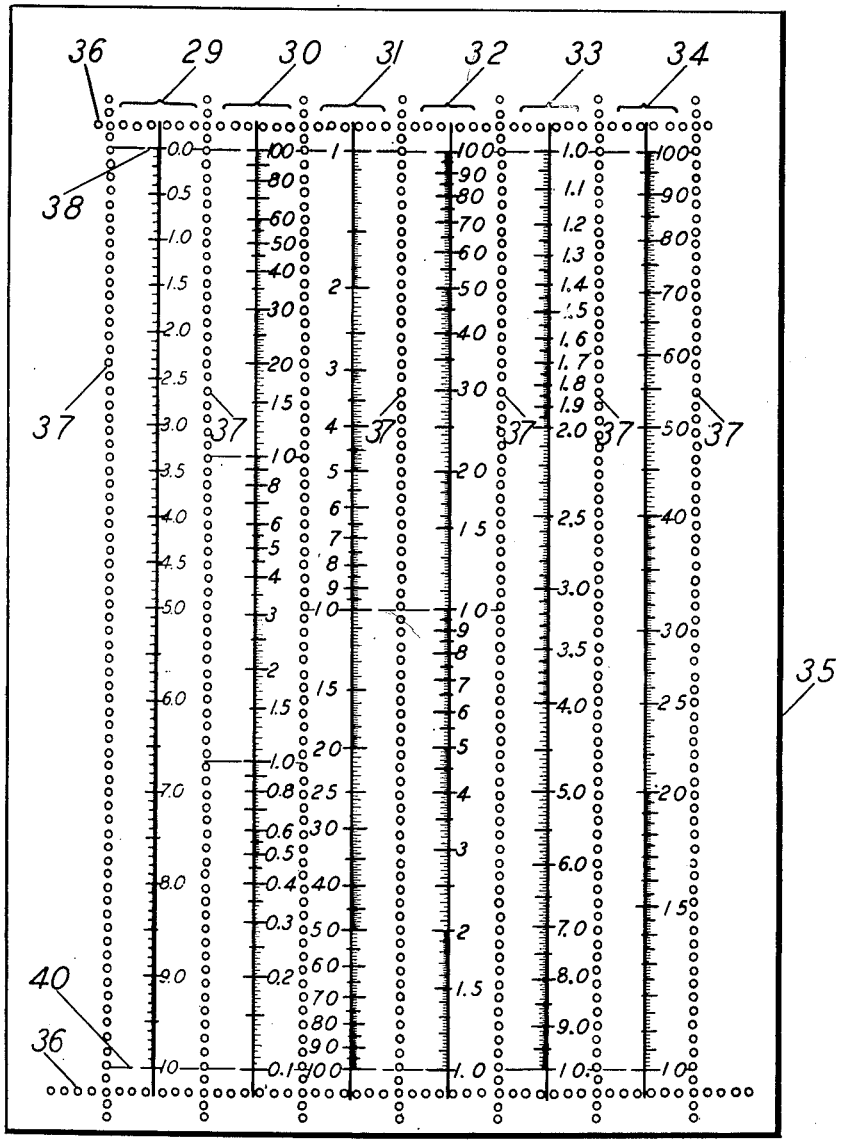
Fig. 2 represents a set of selected scales prepared in accordance with my invention.

Fig. 4 represents the same graphical solution of the problem illustrated in Fig. 1 utilizing my present invention by which I can appreciably shorten the time hitherto required, and simplify the mechanics of preparing the chart itself. Instead of utilizing a plain sheet of paper upon which a zero line is first drawn, the respective spacing of the scales chosen, and the necessary scales designed and drawn as in the conventional method illustrated in Fig. 1, I use as shown in Fig. 3 a chart blank 20 having a plurality of guide lines, 21 to 27 inclusive and zero line 28 by which I can conveniently locate any combination of prefabricated and detachable scales such as strips 29 to 34 inclusive as shown in Fig. 2. For more complex problems more guide lines may be provided as will be seen in Fig. 5.

The chart blank 20, shown in reduced size may be made of ordinary paper or constructed of a transparent plastic sheet material, such as cellulose, acetate or the like. With the use of a transparent master sheet I can place the detachable scales on the rear surface of the master sheet which will be visible therethrough and provide repeated use without destruction of the scales. Where the master sheet is of ordinary paper the scales may be positioned and attached to the top surface of the sheet. Regardless of the material of the master sheet, the zero line 28 is preferably pre-marked on the sheet and with the parallel scale guide lines 21, 22 etc. equally spaced every 10 major units of the graduated zero line. I have arbitrarily illustrated seven scale guide lines, 21 to 27 inclusive, to provide a plurality of ratios between the spacing of any three guide lines. For example in a ratio of 1 to 1 between scales $a$ and $b$ and, $b$ and $c$ ($x$ and $y$ as illustrated in Fig. 1) I can utilize scale guide lines 21, 22 and 23 or 21, 23 and 25 etc. Where I desire a 2 to 1 ratio I may use 21, 23 and 24 or 21, 25 and 27 etc. Any ratio not provided can be easily obtained by interpolation.

The prefabricated scale strips 29 to 34 inclusive may be conveniently marked on a scale sheet 35 which may be of thin transparent or opaque material such as paper. The scales 29 to 34 inclusive are easily separated from one another by simply cutting or by providing horizontal and vertical perforated or tear lines 36 and 37 respectively. As I have illustrated, scale strip 29 represents a uniformly graduated scale which may be used for the zero line and for other uses as will be discussed hereinafter and starts from the top index line 38 and is graduated downward. Scales 30 to 34 inclusive are logarithmic scales. Scale 30 has a one-third unit modulus or 3 cycles per modulus and starts from the index line 40 and is graduated upwardly. Graduations representing the start and end of each cycle are extended over the whole width of the scale strip to facilitate alignment with the zero lines on the master blank. Scales 31 and 32 have one-half unit modulus or 2 cycles per modulus, scale 31 starts from the bottom index line 39 and is graduated upwardly. Scale 32 extends in a reverse direction. Scales 33 and 34 represent unity moduli or one cycle per modulus with scale 33 graduated from top of the index line 39 downward. Scale 34 is graduated in a reverse direction.

A plurality of sheets 35 may be conveniently bound in tablet form for ready use or may be provided in single sheet form. The detachable scale strips may be printed in any desired combination of scales.

It should be noted that the various figures have been reduced to varying degrees in the preparation of the drawing and may not conform dimensionally with each other. The chart in Fig. 4 is constructed by choosing the desired scales from the sheet 35 of Fig. 2. From the example illustrated in Fig. 1, the moduli of the outer scales $a$ and $c$ is 10 are equal and extend in reverse directions, thus scales 33 and 34 can be removed from the sheet 35 by tearing along the perforated lines 37 and placed over or under the chart blank 20 of Fig. 3 and aligned vertically with the desired guide lines 21 to 27 inclusive. Scale 33 graduated from the top down will be aligned with the graduated value 100 sliced at the zero line. Scale 32 is aligned in a similar manner. Scale strip 34 is placed with the constant factor 0.252 at the zero line 28 where the chart blank is opaque, it is more convenient to extend the graduation line at 0.252 before the scale strip is detached from the scale sheet 35 to assist in aligning the scale. The scale strips may be secured to the master sheet by strips of adhesive tape 39, stapled or by providing an adhesive backing on the scales during the manufacture of the scale sheet 35. Uniform scale strip 29 may be placed over the sub-zero line 41 to aid in locating any change in positions of the guide lines if necessary, with respect to the zero line 28.

The transverse line 42 will intersect the three vertical scale strips at the selected points as is shown in Fig. 1.

Figure 5:
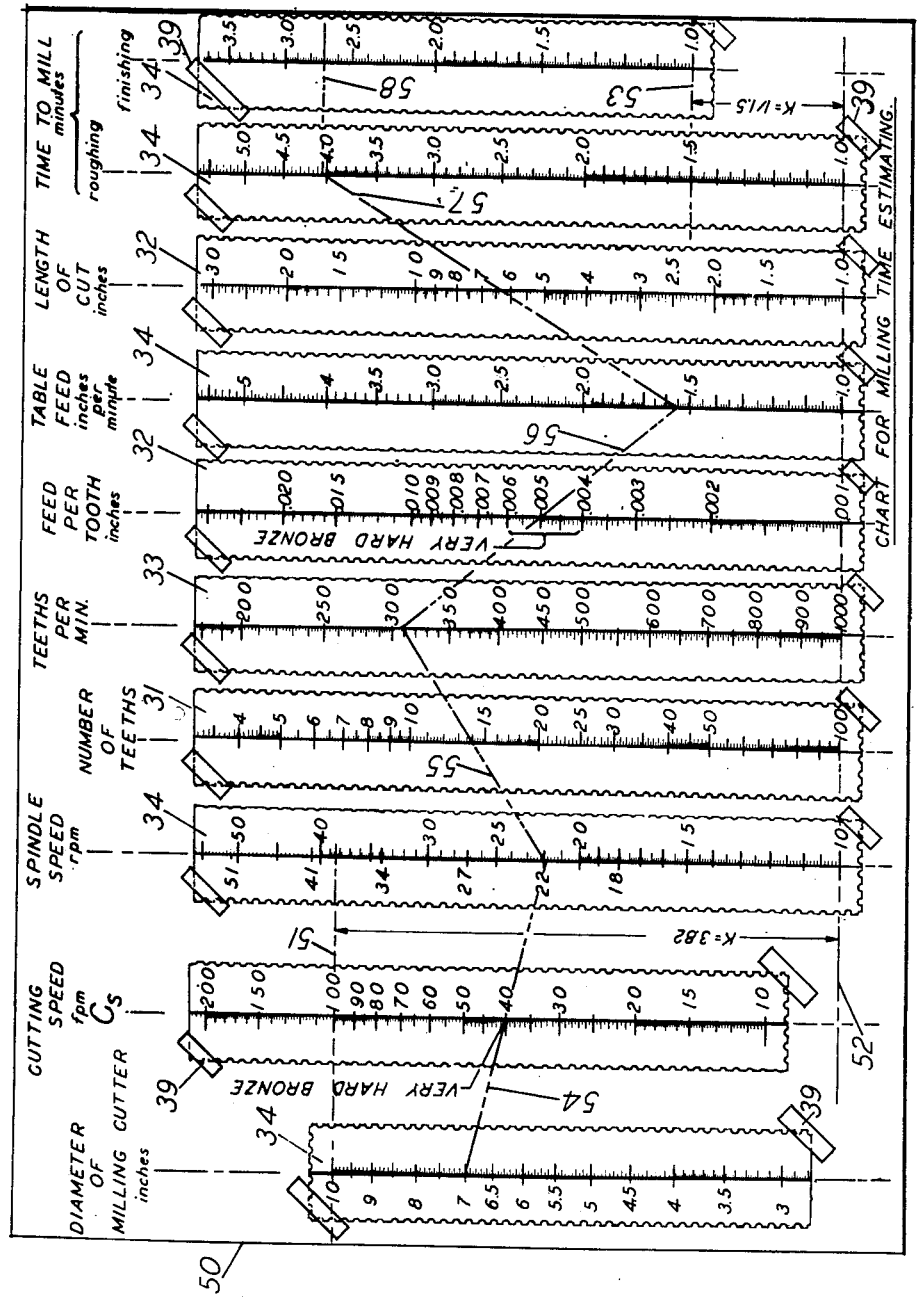
Fig. 5 represents a complex nomographic chart prepared in accordance with my invention.

Fig. 5 illustrates a complex chart 50 for estimating milling time and is constructed in accordance with my novel method utilizing the chart blank sheet 20 shown in Fig. 3 and the sheet of scale strips on sheet 35 in Fig. 2. In several instances the numbering of the graduations in scales are modified by adding a digit to conform with the numeric values used. This in no way changes the graduations of the scale. Since there are two constant factors used, 3.82 (spindle speed or R. P. M. scale) and 1/1.5

(time to mill-finishing scale), and each constant factor necessitates a change of the zero line, there are three zero lines 51, 52 and 53. Zero line 51 intersects the first, second and third scales (reading from left to right), zero line 52 the fourth through ninth scale, and the zero line 53 is assigned to the last scale.

The lines 54, 55, 56, 57 and 58 represent the transverse lines in obtaining the intermediate values for finally determining the solution which is 2.7 minutes of the particular example presented representing the milling time for the very hard bronze the material it is desired to use.

Figure 6:
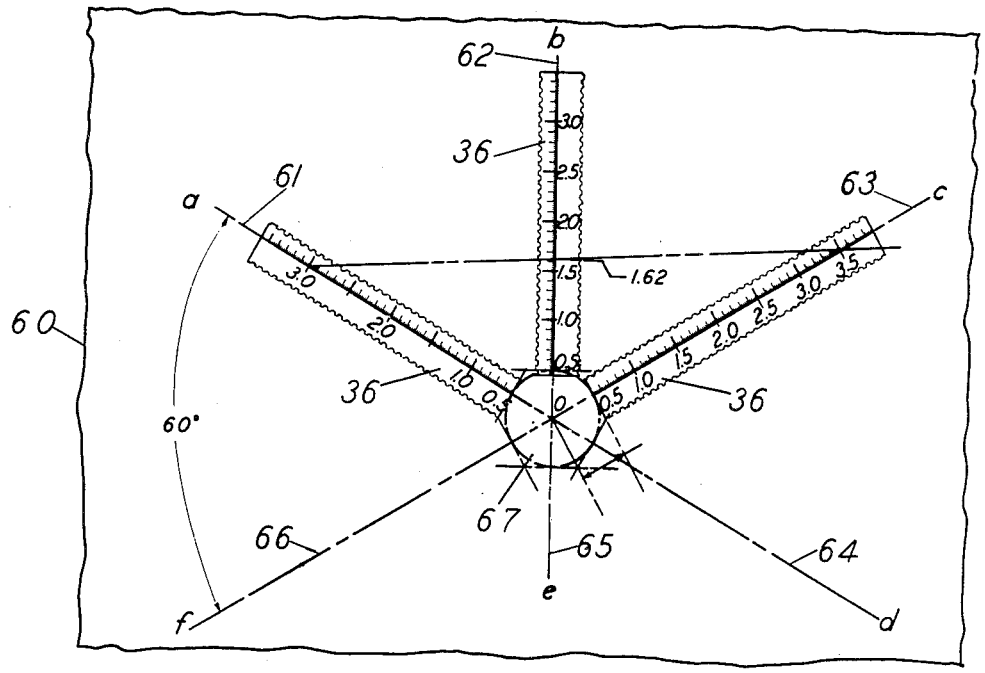
Fig. 6 is a form of nomographic chart employing concurrent scales.

In Fig. 6 I have illustrated the construction of a nomographic chart by my novel means for determining the sum of reciprocals such as $$1/a + 1/b = 1/c$$

which may be for example the formula for determining the resistance of a circuit containing a plurality of resistances connected in parallel, or for determining the focal length of a lens.

The chart 60 shown is provided with radially extending guide lines 61 to 66. The angle between the outer scales $a$ and $c$ may be any convenient angle, and in the example illustrated an angle of 120° has been chosen. The center scale $b$ will be angularly positioned in the same manner as determined in the example described in Fig. 1, that is, the ratio of the moduli of the outer scales. The modulus of the outer scales being equal, the center scale $b$ is positioned to bisect the angle of 120°, or make an angle of 60° with the outer scales. The scales $a$, $b$ and $c$ are uniformly graduated and scale strips 36 from scale sheet 35 in Fig. 2 may be so used. If more than 3 variables are found in the formula additional scales $d$, $e$ and $f$ may be employed with the result carried forward in the manner described in the example illustrated in Fig. 5.

The scale strips 36 are fastened to the chart blank 60 in a similar manner as in the other examples, with each scale originating at the center or "0" point and directed outwardly. In order to avoid crowding of the scales close to the "0" point, a zero circle 67 is drawn at a radius arbitrarily chosen such as 0.5 unit, and each scale starts on the perimeter of the zero circle at the 0.5 graduation.

To solve the problem of $1/3.0 + 1/3.5 = 1x$ the value of $x$ is determined by drawing a straight line between 3.0 on the $a$ scale and 3.5 on the $c$ scale and the value of $x$ of 1.62 is found where the line intersects the $b$ scale.

Figure 7:
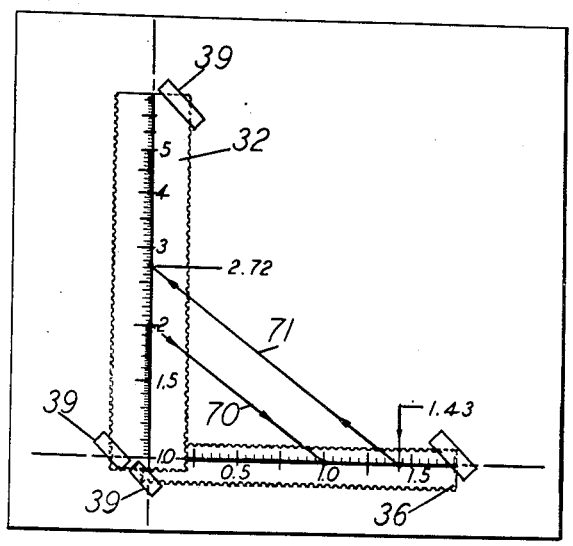
Fig. 7 is a form of nomographic chart employing two scales at right angles for determining the power or root of any number.

Figure 7 illustrates a chart for computing powers and roots. The logarithmic scale strip 32 (taken from scale sheet 35 in Fig. 2) is placed vertical and perpendicular to the uniformly graduated scale 36 from sheet 35 in Fig. 2, with one scale superimposed in the other so that the starting points of both scales coincide. The chart blank illustrated in Fig. 3 may be used for alignment of the scale strips.

The example illustrated is the solution of the problem $2^{1.43}$. This is equivalent to $1.43 \times \log 2$.

The solution is obtained by drawing an index line 70 from the value of the number 2 on the vertical strip 32 to intersect the unity value on the horizontal scale strip 36. A transverse line 71 is thereafter drawn parallel to index line 70 passing through the value of the power (or root) on the horizontal scale, and the transverse line 71 intersects the scale 32 as the value of 2.72 which is the product.

The same procedure would be followed in determining the root of any number.

This solution can be readily used in the complex problem illustrated in Fig. 5, where, for instance, it is necessary to raise the "cutting speed $cs$" (second scale strip from the left hand) to a given power, for example 1.43. Heretofore, a special cutting speed scale had to be constructed with a cycle 1.43 longer than illustrated which was time consuming and tedious. With my novel means and method, the solution illustrated in Fig. 7 can be easily incorporated in the chart of Fig. 5.

Figure 8:
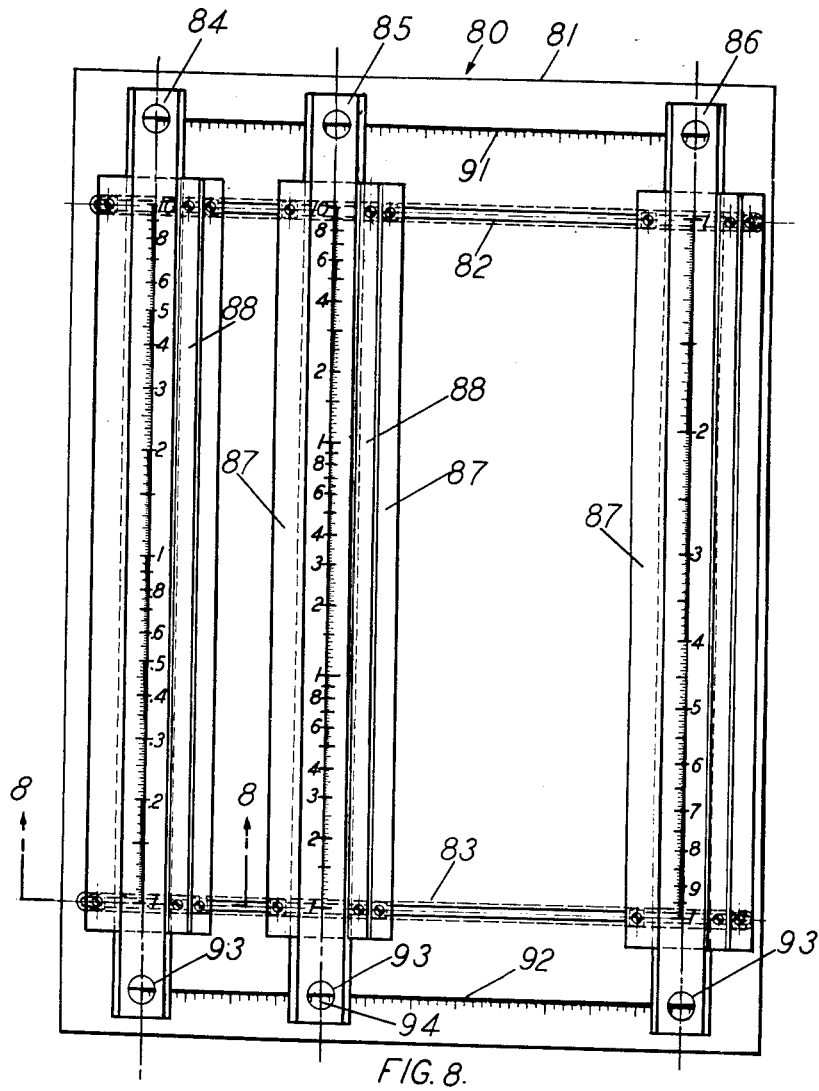
Fig. 8 illustrates a plan view of a modification of my invention utilizing a board on which the scales may be mechanically adjusted and locked in position.
Figure 9:
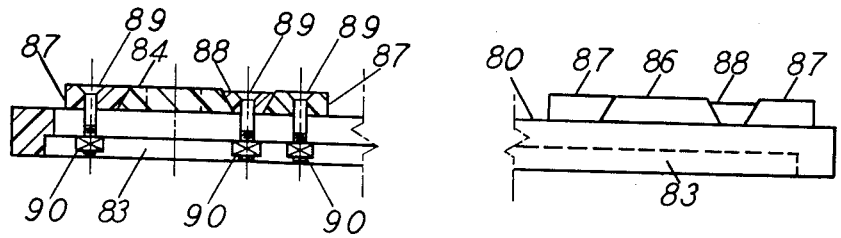
Fig. 9 is a partial cross section view taken along line 8—8 in Fig. 8.

In Figures 8 and 9 I have illustrated a nomographic board 80 which provides a variable spacing between scales and means for quickly and accurately interchanging scales. This device may be conveniently used for the solving of problems as previously described or for setting up a chart sheet containing the properly positioned scales from which copies may be photographically or otherwise reproduced for further use.

The board 80 comprises a plate 81 provided with inverted T slots 82 and 83 extending transversely at the upper and lower ends and short of each side. Scales 84, 85 and 86 constructed of a suitable transparent or opaque material, are slidably mounted between a pair of retaining scale guides 87 and an intermediate gib 88. The scales, guides and gibs have complementary beveled edges to assist in locking the elements together. The guides 87 and gib 88 are adjustably mounted at each end of the plate 81 by bolts and nuts 89 and 90, the nuts fitting within the enlarged channel of the inverted T slots.

Uniformly graduated scales 91 and 92 which may be strips similar in character to scale strip 29 of scale sheet 35 in Fig. 2, or scales marked on the plate 81 are positioned at the top and lower ends of the plate 81 and aligned opposite to each other. Where the scales are made of opaque material sight holes 93 with an index mark 94 may be provided for the alignment of the scales. To position the scales in any vertical position, the bolts are loosened in the guides and gibs and the scale located so that its centerline intersects the upper and lower scale at the same graduation. The scales are then fixed temporarily in position by adhesive tape or any conventional means and the guides are secured in position by tightening their respective bolts. The scales are now free to slide vertically and can be locked in the desired vertical poistion by tightening the bolts on the gib through the wedge action of the beveled edges. The scales may be readily removed and a new scale having the desired graduation substituted.

It will be apparent from the foregoing that I have provided a unique method and means for readily reproducing nomographic charts, which ordinarily is laborious and time consuming. By my novel construction I can in a matter of minutes prepare a simple or complicated nomographic chart with little expense.

The scale sheets permit instant selection of the desired scales and are readily detachable therefrom and readily applied to chart blank in the desired manner. The nomographic board provides a simple means for preparing nomographic charts either directly or by photographic reproduction which are as inexpensive and may be filed away with the particular problem involved. From a few inexpensive sheets, any desired type of monographic chart may be readily prepared and used without any drafting skill or knowledge of mathematics.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. A method for preparing nomographic charts which comprises the steps of preparing a paper guide chart, and a unitary group of detachable paper strips, each calibrated to a predetermined modulus forming a scale, attaching a plurality of selected scales to said chart at predetermined positions dependent upon their scale moduli in accordance with an equation having not less than two variables, and establishing an index line on said paper chart and strips for visually indicating alignment of points on said scales for satisfying the equation.

2. The method of claim 1, wherein the scales selected include logarithmic scales.

3. The method of claim 1 wherein the scales selected include logarithmic scales of different moduli.

4. Nomographic chart apparatus comprising a paper guide chart and a unitary group of detachable paper strips each calibrated to a predetermined modulus forming a scale, said chart provided with guides for enabling a plurality of selected scales to be applied to said chart at predetermined positions dependent upon their scale moduli in accordance with an equation having not less than two variables, whereby an index line may be established on said paper chart and strips for visually indicating alignment of points on said scales for satisfying the equation.

5. The apparatus of claim 4 wherein the group of detachable strips include logarithmic scales.

6. The apparatus of claim 5 wherein the group of detachable strips include logarithmic scales of different moduli.

AUGUST S. LERMER.

References Cited in the file of this patent

UNITED STATES PATENTS

| Number | Name | Date |
|---|---|---|
| 603,088 | Kimball | Apr. 26, 1898 |
| 1,554,467 | Stratton | Sept. 22, 1925 |
| 2,567,882 | Goyan et al. | Sept. 11, 1951 |

FOREIGN PATENTS

| Number | Country | Date |
|---|---|---|
| 17,334 | Great Britain | Aug. 18, 1908 |

OTHER REFERENCES

"Graphical and Mechanical Computation" by Lipka, published by John Wiley & Sons, Inc. (1918), copy in Div. 23, see particularly Art. 3 and the chart provided in the back of the book.